(12) United States Patent
Tanaka

(10) Patent No.: US 6,731,792 B1
(45) Date of Patent: May 4, 2004

(54) METHOD AND APPARATUS FOR ACCURATELY DIVIDING A COLOR IMAGE INTO PROPER REGIONS, AND STORAGE MEDIA STORING A PROGRAM FOR EXECUTING SUCH A METHOD

(75) Inventor: Sumiyo Tanaka, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/377,835

(22) Filed: Aug. 20, 1999

(30) Foreign Application Priority Data

Aug. 24, 1998 (JP) .......................................... 10-237080
Aug. 26, 1998 (JP) .......................................... 10-240046

(51) Int. Cl.⁷ .............................. G06K 9/34; G06K 9/00
(52) U.S. Cl. ........................ 382/164; 382/170; 382/180
(58) Field of Search ................................ 382/164, 165, 382/170, 171, 172, 180

(56) References Cited

U.S. PATENT DOCUMENTS

| 4,689,669 A | | 8/1987 | Hoshino et al. | |
| 4,962,540 A | * | 10/1990 | Tsujiuchi | 382/17 |
| 5,463,470 A | * | 10/1995 | Terashita et al. | 358/298 |
| 5,557,688 A | * | 9/1996 | Nakamura | 382/164 |
| 5,630,037 A | * | 5/1997 | Schindler | 345/592 |
| 5,848,185 A | * | 12/1998 | Koga | 382/173 |
| 5,930,385 A | * | 7/1999 | Fujimoto et al. | 382/162 |
| 6,128,407 A | * | 10/2000 | Ionue | 382/167 |

FOREIGN PATENT DOCUMENTS

| JP | 5-274372 | 10/1993 |
| JP | 8-16789 | 1/1996 |

\* cited by examiner

*Primary Examiner*—Amelia M. Au
*Assistant Examiner*—Brian Le
(74) *Attorney, Agent, or Firm*—McDermott, Will & Emery

(57) ABSTRACT

In a color image dividing method, color differences between pixels of the color image are calculated, and widths of division in directions of axes of a color space are determined on the basis of the color differences between the pixels. Then, the color space is divided into regions according to the widths of division in the directions of the axes, and a color classification number is set for each of the color space regions. Each pixel of the color image is labeled with the color classification number of the corresponding color space region in which a color of the pixel is included. Then, the color image is divided into regions based on the classification numbers of the labeled pixels. When pixels having a same classification number occur consecutively, those pixels are determined to constitute one region.

22 Claims, 11 Drawing Sheets

2a : COLOR CLASSIFICATION NUMBER CREATING PORTION
2b : DIVIDING PORTION

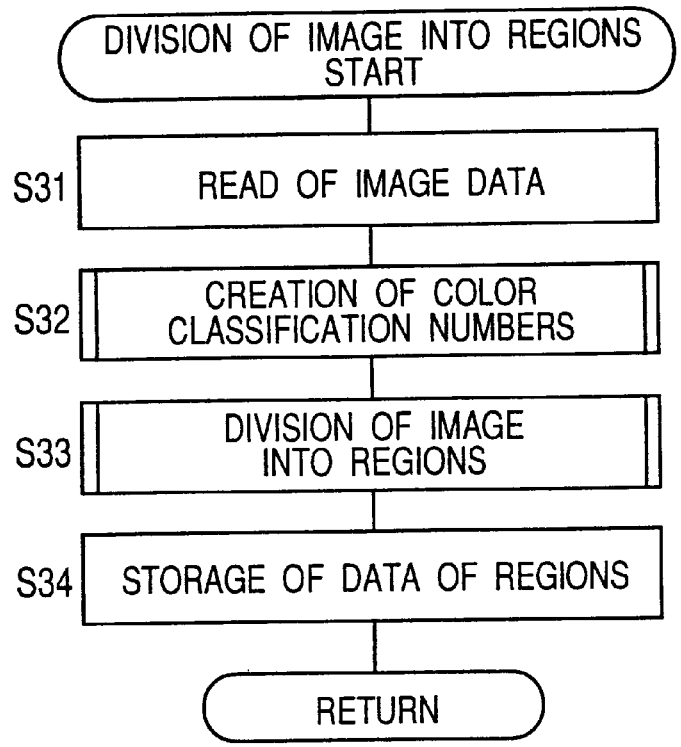
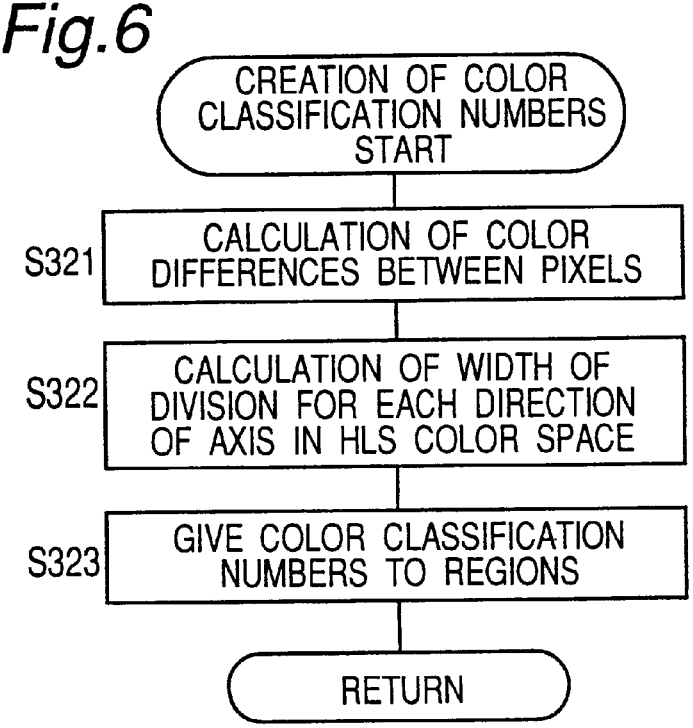

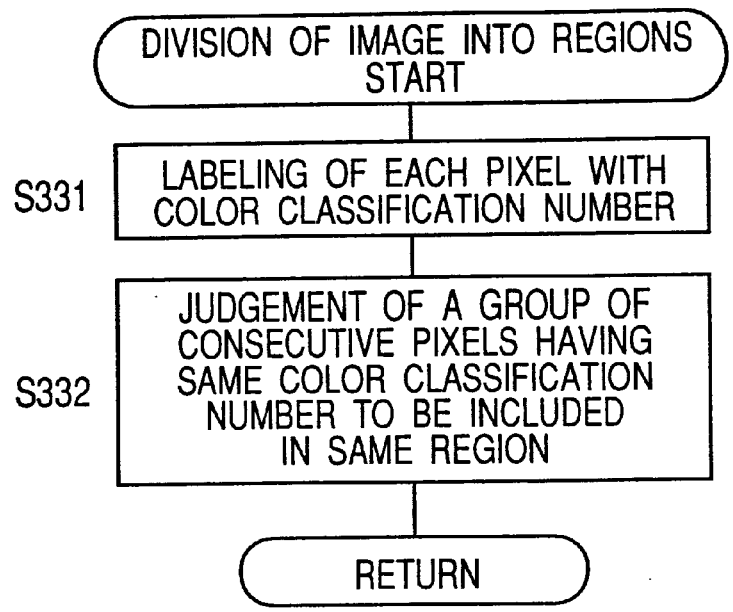
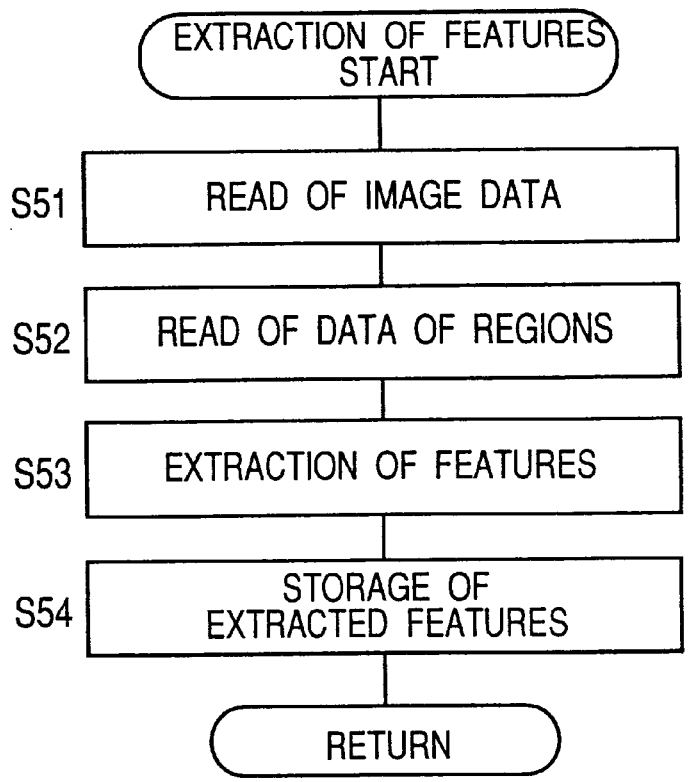

102a : IMAGE DIVIDING PORTION

102b : REGION INTEGRATING PORTION

102c : OBJECT REGION DETERMINING PORTION

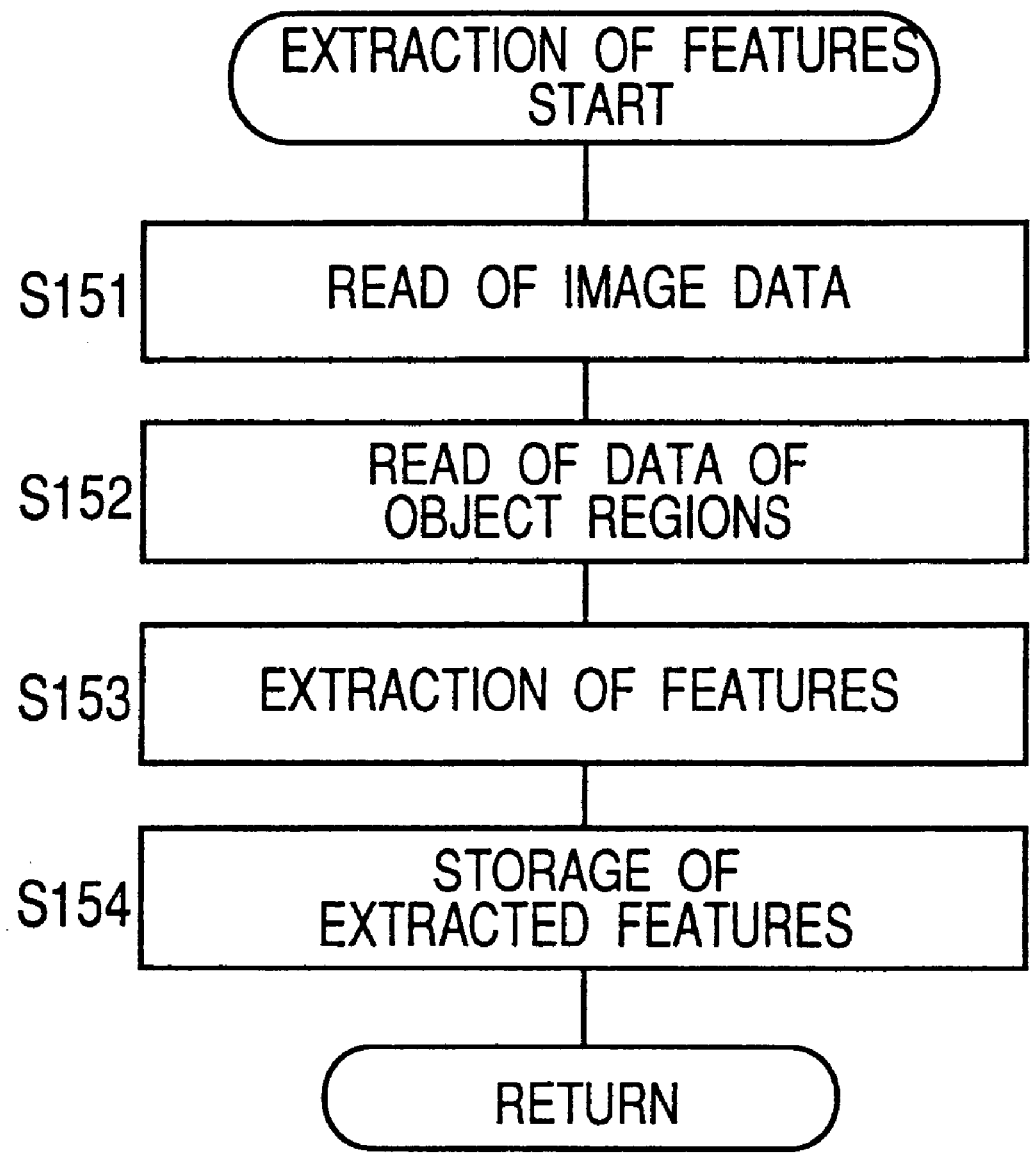

METHOD AND APPARATUS FOR ACCURATELY DIVIDING A COLOR IMAGE INTO PROPER REGIONS, AND STORAGE MEDIA STORING A PROGRAM FOR EXECUTING SUCH A METHOD

This application is based on application(s) No(s). 10-237080 and 10-240046 filed in Japan, the contents of which are hereby incorporated by reference.

BACKGROUND OF THE INVENTION

The present invention generally relates to a color image processing method and apparatus and particularly, to a method and apparatus for dividing a color image into regions, which method is used for shape extraction in an image retrieval process or the like. The present invention also relates to storage media that store information processing programs for carrying out such dividing method.

Conventionally, in executing color image retrieval, a process of dividing an image into regions has been executed as a preprocessing for extracting the shape of an object or objects in the image to be used as a retrieval condition. However, with regard to color images taken in from a digital camera or a scanner, it is sometimes the case that the background, which seems to have a single color at a glance, is not monochrome on the pixel-value basis or that the background has a color close to that of an object in the image. In the case of such color images, in order to remove the background from the image with high accuracy through simple fixed color classification or to divide the image into a plurality of regions, it is required to finely classify the colors and divide the image into very small regions and thereafter integrate or unite some of the very small regions into a larger region through some determining calculations. This leads to a first problem that much processing time is consumed.

On the other hand, in the case of natural images such as landscape images, the background of, for example, sky or sea has a gradation, and objects included in the image have shades. For this reason, if such an image is divided into a plurality of regions simply by colors, it is very possible that a single background, region having a gradation and a single object region having shades is erroneously extracted as a plurality of regions. This is a second problem.

SUMMARY OF THE INVENTION

An object of the present invention is to solve the first problem and provide a color image dividing method capable of reducing the processing time and executing the division of a color image into appropriate regions with high accuracy regardless of the magnitude of change in color of the image, as well as an apparatus that carries out the method and a program storage medium storing a program for carrying out such a method.

Another object of the present invention is to solve the second problem and provide a color image diving method including a region integrating step, which is capable of extracting regions of an object having gradation and shade as one region, as well as an apparatus that carries out the method and a program storage medium storing a program for carrying out such a method.

In order to accomplish the first object, the present invention provides a method of dividing a color image into regions, comprising the steps of:

calculating color differences between pixels of the color image;

determining widths of division in directions of axes of a color space on the basis of the color differences between the pixels;

setting color classification numbers for respective color space regions into which the color space has been divided according to the widths of division in the directions of the axes;

labeling each pixel of the color image with the color classification number of a corresponding color space region in which a color of the pixel is included; and dividing the color image into same-color regions based on the color classification numbers of the labeled pixels, wherein when consecutive labeled pixels have a same classification number, those pixels are determined to constitute one same-color region.

With this method, the color image is divided into concolorous, or same-color regions corresponding to the regions of the color space, which is an HLS color space, for example. This obviates the need of segmenting the image into fine fractions through the precise classification of colors, and then integrating or combining some or all of the fractions into a single region.

The present invention also provides a program storage medium which stores an information processing program comprising all the steps of the above method of the invention.

The method can be carried out by, for example, an image processing device according to one aspect of the invention, which comprises:

a memory for storing data of a color image;

a setting section which determines widths of division in directions of axes of a color space on the basis of color differences between pixels of the color image stored in the memory, and sets a color classification number for each of color space regions into which the color space has been divided according to the widths of division; and a processing section which labels each pixel of the color image stored in the memory with the color classification number of a corresponding color space region in which a color of the pixel is included.

In one embodiment, the image processing device further comprises a dividing section which divides the color image into regions based on the color classification numbers of the labeled pixels, wherein when consecutive labeled pixels have a same classification number, those pixels are determined to constitute one region.

Furthermore, in order to accomplish the second object, the present invention provides a method of dividing a color image into regions, comprising the steps of:

dividing a color image into regions based on color information of the color image;

calculating a gradation region-determining criterion based on color differences between pixels of the color image; and integrating consecutive regions among all the regions of the color image with one another when these consecutive regions are judged to constitute one gradation region, wherein judgement whether or not the consecutive regions constitute a gradation region is done based on the gradation region-determining criterion and continuity of color change at each of boundaries between the consecutive regions.

With this second method of the invention, a region including gradation and shade in the image can be extracted as a single region, and not as a plurality of regions.

The present invention also provides a program storage medium which stores an information processing program comprising all of the steps that the second method of the invention comprises.

The second method can be carried out by an image processing device according to one aspect of the invention, which comprises:

a memory for storing data of a multiplicity of regions into which a color image has been divided based on color information of the color image;

a setting section which determines a criterion used for judging whether adjacent regions among the multiplicity of regions constitute a gradation region, based on color differences between pixels of the color image; and a processing section which integrates the adjacent regions when judging the adjacent regions to be a gradation region based on the criterion set by the setting section and continuity of color change at each of boundaries between the adjacent regions.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a flowchart showing a subroutine for an image dividing process performed in the main routine of FIG. 4;

FIG. 6 is a flowchart showing a color classification number creation process performed in the image dividing subroutine of FIG. 5;

FIG. 7 is a flowchart showing an image dividing process performed in the image dividing subroutine of FIG. 5;

FIG. 8 is a flowchart showing a feature extracting process performed in the main routine of FIG. 4;

FIG. 13 is a flowchart showing a feature extracting process performed in the main routine of FIG. 10.

DETAILED DESCRIPTION OF THE PREFERRED EMBODIMENTS

First Embodiment

Figure 1:
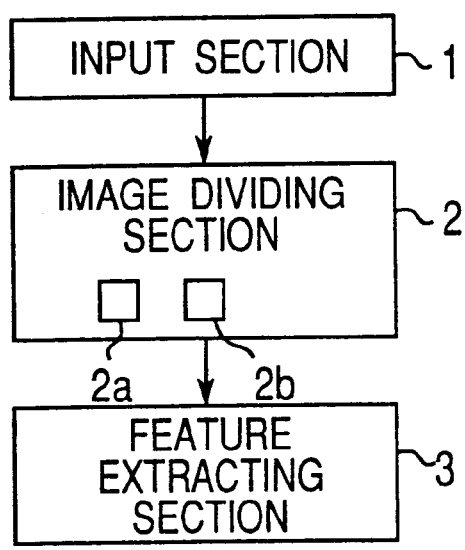
FIG. 1 is a functional block diagram of a characteristic-region extracting apparatus which employs a color image dividing method according to one embodiment of the present invention.

FIG. 1 is a functional block diagram of a characteristic-region extracting apparatus as an image processing apparatus employing a method of dividing a color image into regions according to one embodiment of the present invention. As shown, functionally, the apparatus has an input section 1 into which image data and a variety of instructions are input, an image dividing section 2 for executing division of a color image into regions and a feature extracting section 3 for extracting features from image data that have undergone the division process in the image dividing section 2. The image dividing section 2 has a color classification number creating portion 2a and a dividing portion 2b.

Figure 2:
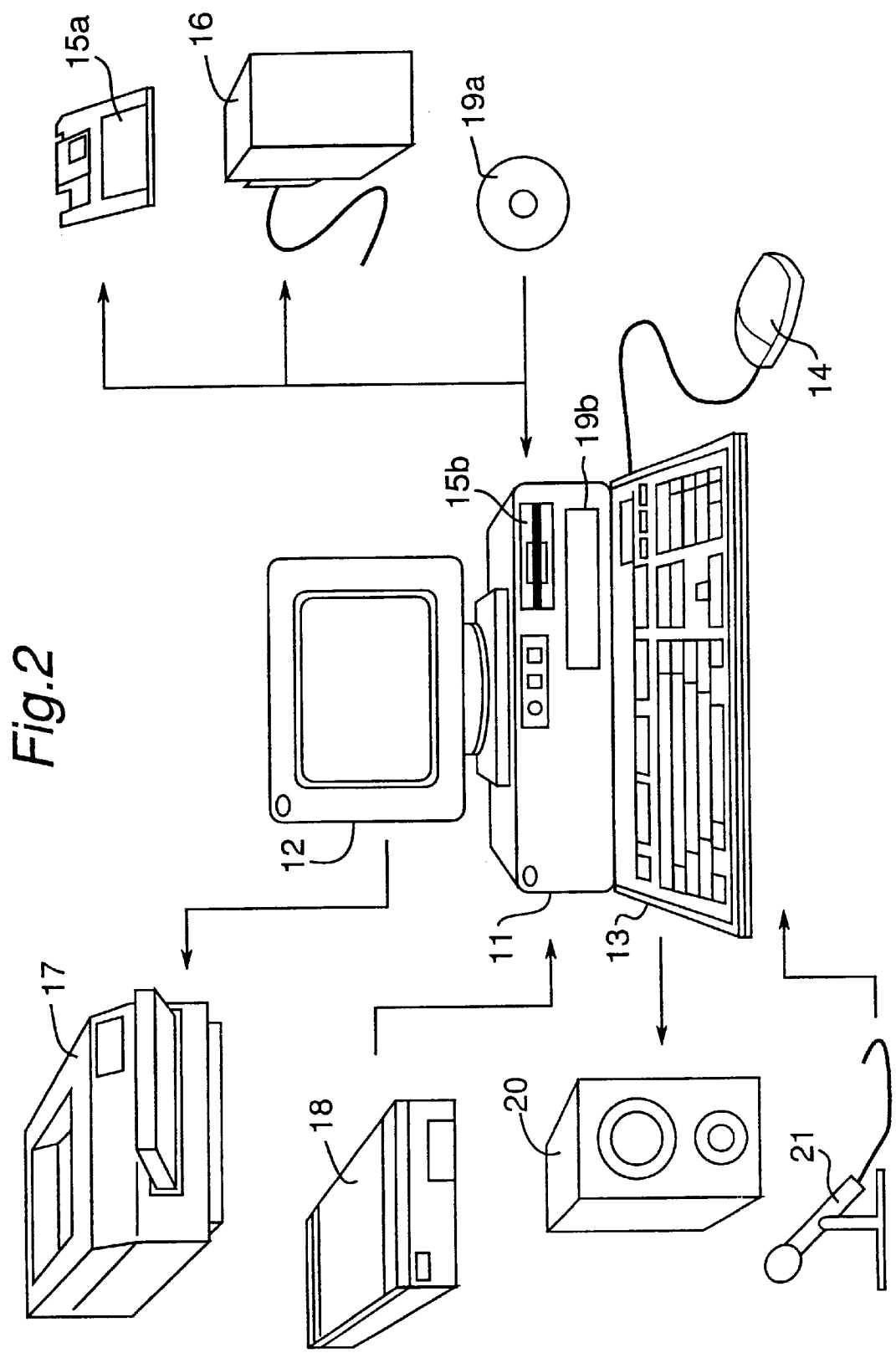
FIG. 2 shows the construction of hardware of the characteristic-region extracting apparatus of FIG. 1.

FIG. 2 shows a hardware construction of the characteristic-region extracting apparatus.

As shown in FIG. 2, the characteristic-region extracting apparatus has a control unit 11 for controlling the operation of the whole apparatus, a CRT (Cathode Ray Tube) 12 for displaying images and characters as well as various pieces of information necessary for operation, a keyboard 13 and a mouse 14 for executing a variety of input operations, instructing operations and the like, a floppy disk drive 15b built in the control unit 11 for executing recording data to and reproducing data from a floppy disk 15a that serves as a data storage medium, and a hard disk unit 16. The apparatus also has a printer 17 for outputting image data, drawings or the like formed through image edition, a scanner 18 for taking in image data, a CD-ROM drive 19b mounted in the control unit 11 for executing reproduction of a CD (Compact Disk) 19a, a loudspeaker 20 for outputting sound, and a microphone 21 for inputting sound. The CRT 12, the keyboard 13, the mouse 14, the hard disk unit 16, the printer 17, the scanner 18, the loudspeaker 20 and the microphone 21 are connected to the control unit 11.

The hard disk device 16, the scanner 18, the CD-ROM drive 19b, the loudspeaker 20, and the microphone 21 can be incorporated in the control unit 11 and constructed together as a unit.

Figure 3:
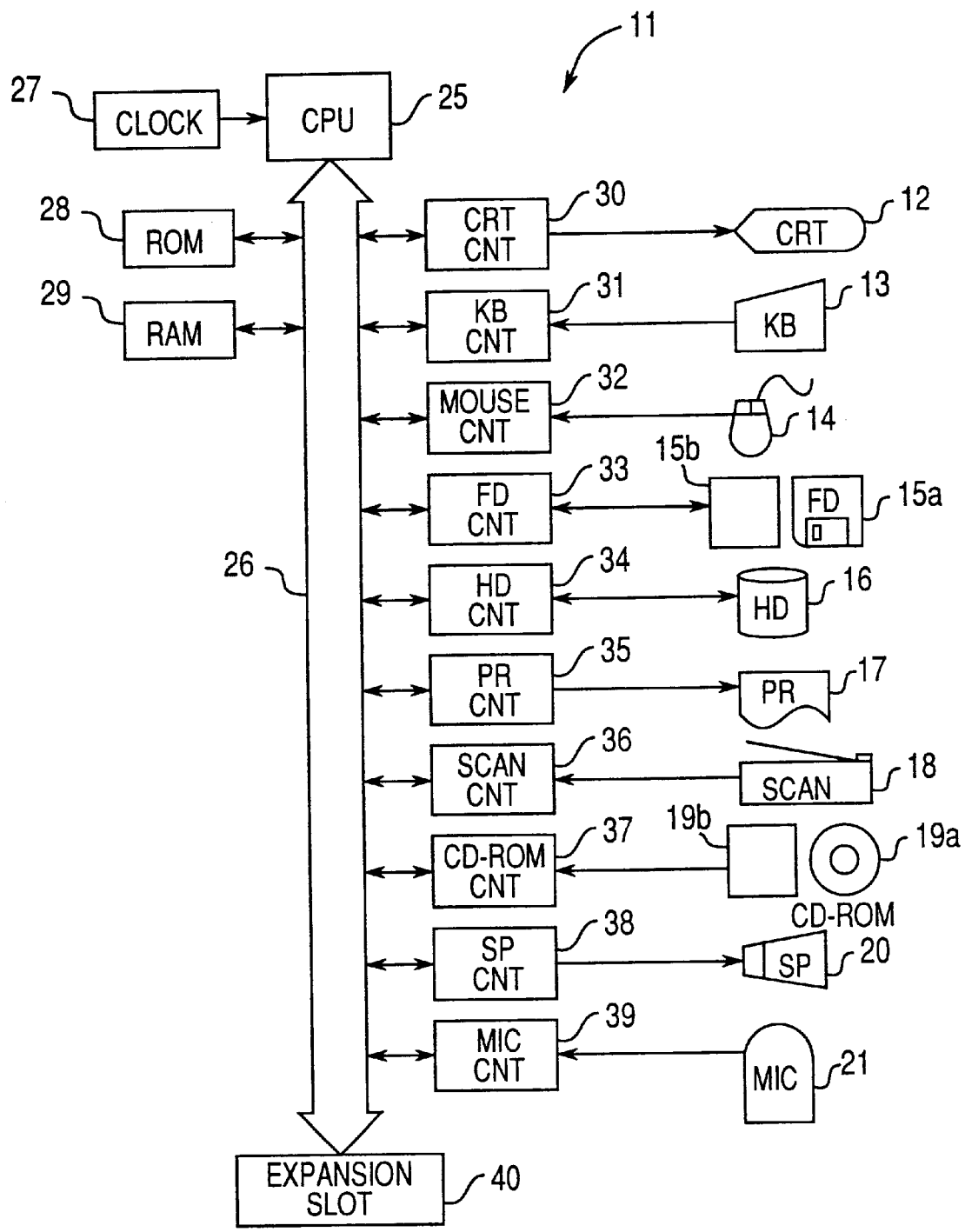
FIG. 3 is a block diagram of the hardware of FIG. 2 depicted centering on a CPU built in a control device.

FIG. 3 is a block diagram of the characteristic-region extracting device centered on the CPU 25 built in the control device 11 shown in FIG. 2.

For the CPU 25, a product i80486DX manufactured by Intel, for example, is used. Through a data bus 26, the CPU 25 is connected with a ROM (read-only memory) 28 storing programs for controlling the entire apparatus, a RAM (random access memory) 29 storing various data and programs, a display control circuit 30 for displaying various pieces of information such as images and characters on the CRT 12, a keyboard control circuit 31 for controlling transfer of inputs from the keyboard 13, a mouse control circuit 32 for controlling transfer of inputs from the mouse 14, a floppy disk drive control circuit 33 for controlling the floppy disk drive 15b, a hard disk control circuit 34 for controlling the hard disk device 16, a printer control circuit 35 for controlling the output operation of the printer 17, a scanner control circuit 36 for controlling the scanner 18, a CD-ROM drive control circuit 37 for controlling the CD-ROM drive 19b, a loudspeaker control section 38 for controlling the loudspeaker 20, and a microphone control circuit 39 for controlling the microphone 21.

The CPU 25 is also connected with a clock 27 for generating a reference clock signal necessary for operating the entire apparatus. The CPU 25 is further connected, through the data bus 26, with an expansion slot 40 for connecting various expansion boards therewith.

A SCSI board may be connected with the expansion slot 40 to connect the floppy disk drive 15b, the hard disk device 16, the scanner 18, and the CD-ROM drive 19b with the CPU 25 through the SCSI board.

In the characteristic-region extracting apparatus, the keyboard 13, the mouse 14, the scanner 18 and the CD-ROM drive 19b constitute the input section 1 shown in FIG. 1, while the CPU 25 constitutes the image dividing section 2 and the feature extracting section 3 shown in FIG. 1.

The characteristic-region extracting apparatus having the above construction operates according to the flowcharts of FIG. 4, FIG. 5, FIG. 6, FIG. 7 and FIG. 8.

Figure 4:
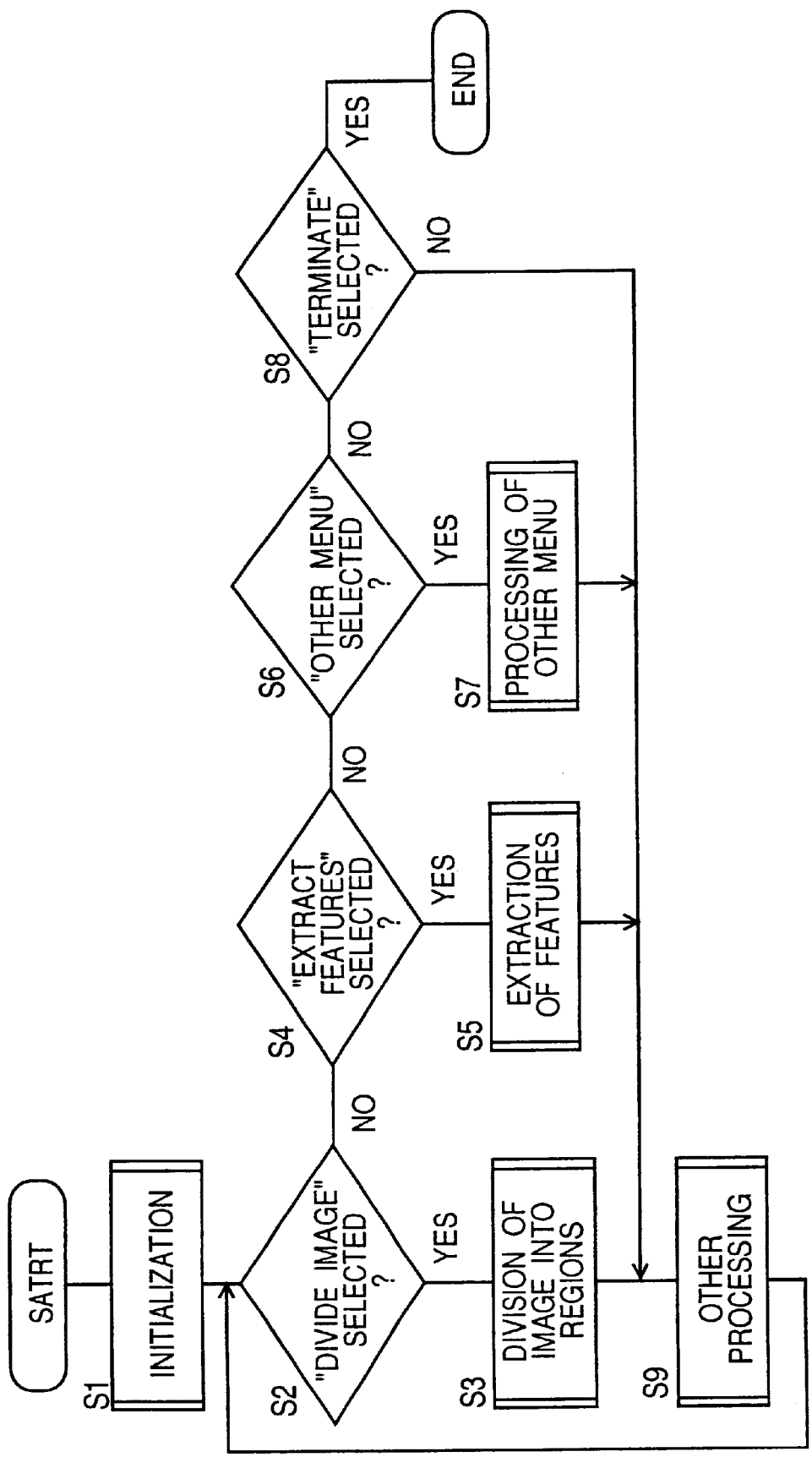
FIG. 4 is a flowchart of a main routine to be executed under control of the CPU of FIG. 3.

FIG. 4 is a flowchart showing a main routine of the program for the characteristic-region extracting apparatus.

Upon turning on the apparatus, the program starts, and at step S1, flags necessary in each processing described later are initialized, and initial setting such as display of an initial screen on the CRT 12 is executed.

Next, the program flow proceeds to step S2 to determine whether or not an item "DIVIDE IMAGE" has been selected from a job menu on the initial screen of the CRT 12. If it is determined that the job "DIVIDE IMAGE" has been selected, then the program flow proceeds to step S3 to perform a process of "division of an image into regions" by the image dividing section 2 and then proceeds to step S9. If it is determined at step S2 that the item "DIVIDE IMAGE" has not been selected, then the program flow proceeds to step S4.

Next, it is determined at step S4 whether or not an item "EXTRACT FEATURES" has been selected. If it is determined that the item "EXTRACT FEATURES" has been selected, the program flow proceeds to step S5 to perform a process of "extraction of features" by means of the feature extracting section 3 and then proceeds to step S9. If it is determined at step S4 that the job "EXTRACT FEATURES" has not been selected, then the program flow proceeds to step S6.

Next, it is determined at step S6 whether or not an item "other menu" has been selected. If it is determined that the item "other menu" has been selected, then the program flow proceeds to step S7 to execute the other menu processing and proceeds to step S9. If it is determined that the item "other menu" has not been selected, then the program flow proceeds to step S8.

Then, it is determined at step S8 whether or not an item "TERMINATE" has been selected from the job menu. If it is determined that the item "TERMINATE" has been selected, then the processing of the main routine ends. If it is determined at step S8 that the item "TERMINATE" has not been selected, then the program flow proceeds to step S9 to execute other processing at step S9 and thereafter returns to step S2.

The process of "division of an image into regions" at step S3 and the process of "extraction of features" at step S5 will be described below. It is to be noted that because the other steps have no direct relation to the present invention, no detailed description is provided therefor.

<Division of Image into Regions>

FIG. 5 is a flowchart showing a subroutine for the "division of image into regions" process of step S3 of the aforementioned main routine.

First, image data that is expressed by RGB values and is subjected to division is read at step S31.

Next, the program flow proceeds to step S32 to execute color space division of the image data based on color information included in the image data to thereby create color classification numbers.

Next, the program flow proceeds to step S33 to execute labeling of each pixel of the image data every classified color to thereby divide the image into regions.

Then, the program flow proceeds to step S34 to store data of the regions and thereafter returns to the main routine of FIG. 4. The region data stored in this stage is utilized in the feature extracting process described later.

FIG. 6 is a flowchart showing the process of "creation of color classification numbers" (step S32 of FIG. 5) executed by the color classification number creating portion 2a of the image dividing section 2.

A hue value (H), a lightness value (L) and a saturation value (S) of each pixel of the image data expressed by the RGB values are obtained at step S321, and color differences (hue differences, lightness differences and saturation differences) between each adjacent pixels are calculated.

Next, the program flow proceeds to step S322 to calculate the widths of division in the directions of each axis of an HLS color space on the basis of the color differences obtained at step S321 in order to classify the color features of the image in the HLS color space.

Then, the program flow proceeds to step S323 to divide the HLS color space by the obtained widths of division in each axis direction and give color classification numbers to the regions of the HLS color space and returns to the main routine of FIG. 4.

The following methods (1) through (5) can be employed at steps S321 and S322 to determine the widths of division in the directions of each axis of the HLS color space from the color differences between every adjacent pixels.

(1) With respect to one pixel, the hue difference, the lightness difference and the saturation difference from a pixel on its right-hand side and a pixel on its downside are obtained. Then, mean values of the hue differences, of the lightness differences and of the saturation differences of all the pixels are obtained using the following expressions (a), (b) and (c), and those mean values are employed as the widths of division in the directions of axes of the HLS color space, respectively.

Image size: $M \times N$ (pixels)

Color of each pixel: $(H, L, S)_{i,j}$ $$\text{Hue difference mean value} = \frac{\sum_{i,j} |H_{i,j} - H_{i+1,j}| + \sum_{i,j} |H_{i,j} - H_{i,j+1}|}{(M-1) \cdot N + (N-1)} \quad (a)$$

Hue difference: 0.0 – 180.0

$$\text{Lightness difference mean value} = \quad (b)$$

$$\frac{\sum_{i,j} |L_{i,j} - L_{i+1,j}| + \sum_{i,j} |L_{i,j} - L_{i,j+1}|}{(M-1) \cdot N + (N-1)}$$

Lightness difference: 0.0 – 1.0

$$\text{Saturation difference mean value} = \quad (c)$$

$$\frac{\sum_{i,j} |S_{i,j} - S_{i+1,j}| + \sum_{i,j} |S_{i,j} - S_{i,j+1}|}{(M-1) \cdot N + (N-1)}$$

Saturation difference: 0.0 – 1.0

(2) With respect to one pixel, the hue difference, the lightness difference and the saturation difference from a pixel on its right-hand side and a pixel on its downside are obtained. Then, the mean values of the hue differences, of the lightness differences and of the saturation differences of all the pixels are obtained using the above expressions (a)–(c), respectively, and also, standard deviation values are obtained for the hue differences, the lightness differences and the saturation differences, respectively. The sum of the mean value and the standard deviation value of the hue differences, the sum of the mean value and the standard deviation value of the lightness differences, and the sum of the mean value and the standard deviation value of the saturation differences are employed as the widths of division in the directions of axes of the HLS color space, respectively.

(3) In the above method (2), values are calculated using another criterion for each direction of the axes of the HLS color space, taking characteristics of hue, lightness and saturation into consideration, and employed as the widths of division in the directions of axes of the HLS color space, respectively. Such a value may be, for example, the sum of the mean value and the standard deviation value multiplied by a weight coefficient that is different between the directions of the axes.

(4) In any one of the methods (1)-(3), with respect to one pixel, not only the hue difference, the lightness difference and the saturation difference from the right pixel and the downside pixel but also the hue difference, the lightness difference and the saturation difference from an upper right pixel and a lower right pixel are obtained. Then, results of calculation based on the hue differences, lightness differences and saturation differences of all the pixels are employed as the widths of division in the directions of the axes of the HLS color space, respectively.

(5) In any one of the methods (1)-(4), with respect to one pixel, not only the hue differences, the lightness differences and the saturation differences from the adjacent pixels but also the hue differences, the lightness differences and the saturation differences from pixels within a predetermined range are obtained. Then, results of calculation based on the hue differences, lightness differences and saturation differences of all the pixels are employed as the widths of division in the directions of the axes of the HLS color space, respectively.

FIG. 7 is a flowchart showing the subroutine of the image dividing process executed at step S33 of FIG. 5 by the dividing portion 2b of the image dividing section 2.

First, at step S331, each pixel is labeled with a color classification number in conformity with its color.

Next, the program flow proceeds to step S332 at which a group of consecutive pixels that have an identical color classification number is determined to be one region, and then the program flow returns to the main routine of FIG. 4.

<Extraction of Features>

FIG. 8 is a flowchart showing the subroutine for the feature extracting process of step S5 in the main routine of FIG. 4.

First, image data to be subjected to the feature extraction is read at step S51.

Next, at step S52, region data corresponding to the read image data are read.

Next, at step S53, features of the subject image are extracted from the image data and the region data.

Then, at step S54, the extracted features are stored, and the program flow returns to the main routine of FIG. 4.

The features extracted from the image data and the region data at step S53 include, for example, the following items (i) and (ii).

(i) Color information and texture information of the whole image.

(ii) Size, color information, contour, and texture information of the regions.

The obtained features are utilized for image recognition, image retrieval and so on.

As described above, the color image is divided into concolorous, or same-color regions corresponding to the regions of the HLS color space. This obviates the need of segmenting the image into fine fractions through the precise classification of colors, and then integrating or combining some or all of the fractions into a single region. As a result, the processing time for dividing the image into appropriate regions is shortened. Furthermore, when the widths of division of the HLS color space are determined on the basis of the color differences (hue difference, lightness difference and saturation difference) between the pixels of the color image so as to increase or decrease depending on the magnitude of color change of the color image, the color image can be accurately divided into appropriate regions regardless of the magnitude of the color change in the color image.

If the widths of division in the directions of the axes of the HLS color space are determined on the basis of the mean value of the hue differences, of the lightness differences and of the saturation differences between the pixels of the color image, the change in color in the whole color image can be accurately caught through the color differences (hue difference, lightness difference and saturation difference) between pixels in the HLS color space, so that the widths of division in the directions of the axes of the color space can well conform to the color change in the color image.

Furthermore, if the widths of division in the directions of the axes of the HLS color space are determined on the basis of the mean values and the standard deviation values of the hue differences, of the lightness differences and of saturation differences between the pixels of the color image, those widths of division are increased when the color image has great variations, or scattering, in hue, lightness and saturation. Therefore, even if the color image has great variations in hue, lightness and/or saturation, color change of the whole color image can be accurately caught.

Although in the above-mentioned embodiment, the floppy disk 15a and the hard disk device 16 provide image data storage media, other information storage media such as a magneto-optic disk may be used to store data. Also, the scanner 18 and the CD-ROM drive 19b are used as the input section 1 in the embodiment, but, other input devices such as a still video camera, a digital camera or the like may be used. Further, output devices such as a digital copying machine may be used instead of or in addition to the printer 17.

Also, although the HLS color space is used in the embodiment, other color spaces such as the L*a*b* color space (JIS Z8729-(1980)) may be used instead.

Also, the embodiment has been described taking the characteristic-region extracting apparatus in which the program for controlling the whole control unit 11 is stored in the ROM 28. However, it is also acceptable to store part or the whole of the program of the present invention in a program storage medium such as a floppy disk, and read and execute the program in an information processing device such as a personal computer as necessary.

Second Embodiment

Figure 9:
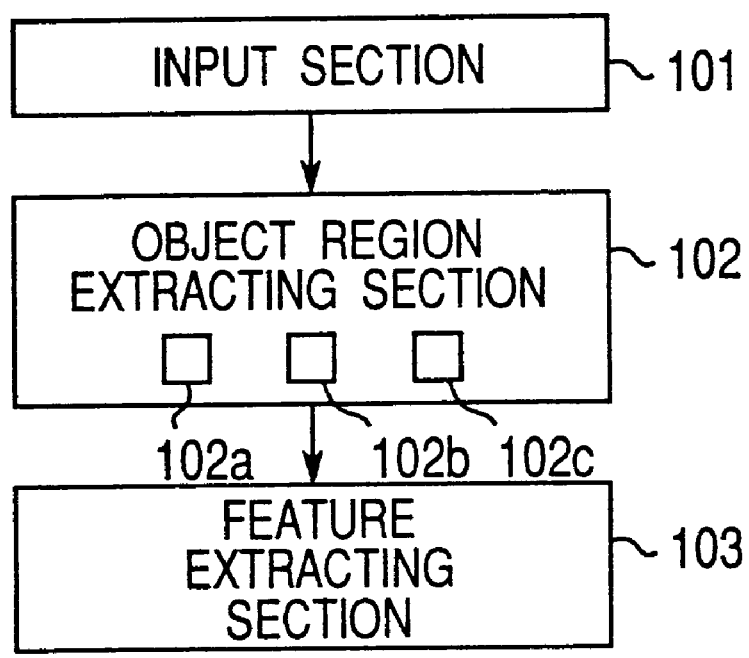
FIG. 9 is a functional block diagram of a characteristic-region extracting apparatus in which a color image region integrating method according to a second embodiment of the present invention is carried out.

FIG. 9 is a block diagram of a characteristic-region extracting apparatus as an image processing apparatus using a color image region dividing method including a region integration step according to another embodiment of the present invention. As shown, in the functional aspect, the apparatus has an input section 101 into which image data and a variety of instructions are input, an object region extracting section 102 for extracting object regions from a color image, and a feature extracting section 103 for extracting features from the image data of which an object region or object regions have been extracted by the object region extracting section 102. The object region extracting section 102 has an image dividing portion 102a for executing division of a color image into regions on the basis of the color information of the image data, a region integrating portion 102b for integrating some or all of the divisions or regions obtained by the image dividing portion 102a, and an object region determining portion 102c for determining the object region from regions obtained after the region integration process executed by the region integrating portion 102b.

The apparatus of the second embodiment has substantially the same hardware construction as that of the first embodiment shown in FIGS. 2 and 3. Thus, the description on the hardware construction of the first embodiment is applied to the second embodiment, and reference is made to FIGS. 2 and 3 as necessary in the following description.

In this characteristic-region extracting apparatus, the keyboard 13, mouse 14, scanner 18 and CD-ROM drive 19b constitute the input section 101 shown in FIG. 9, while the CPU 25 constitutes the object region extracting section 102 and the feature extracting section 103 shown in FIG. 9.

Figure 10:
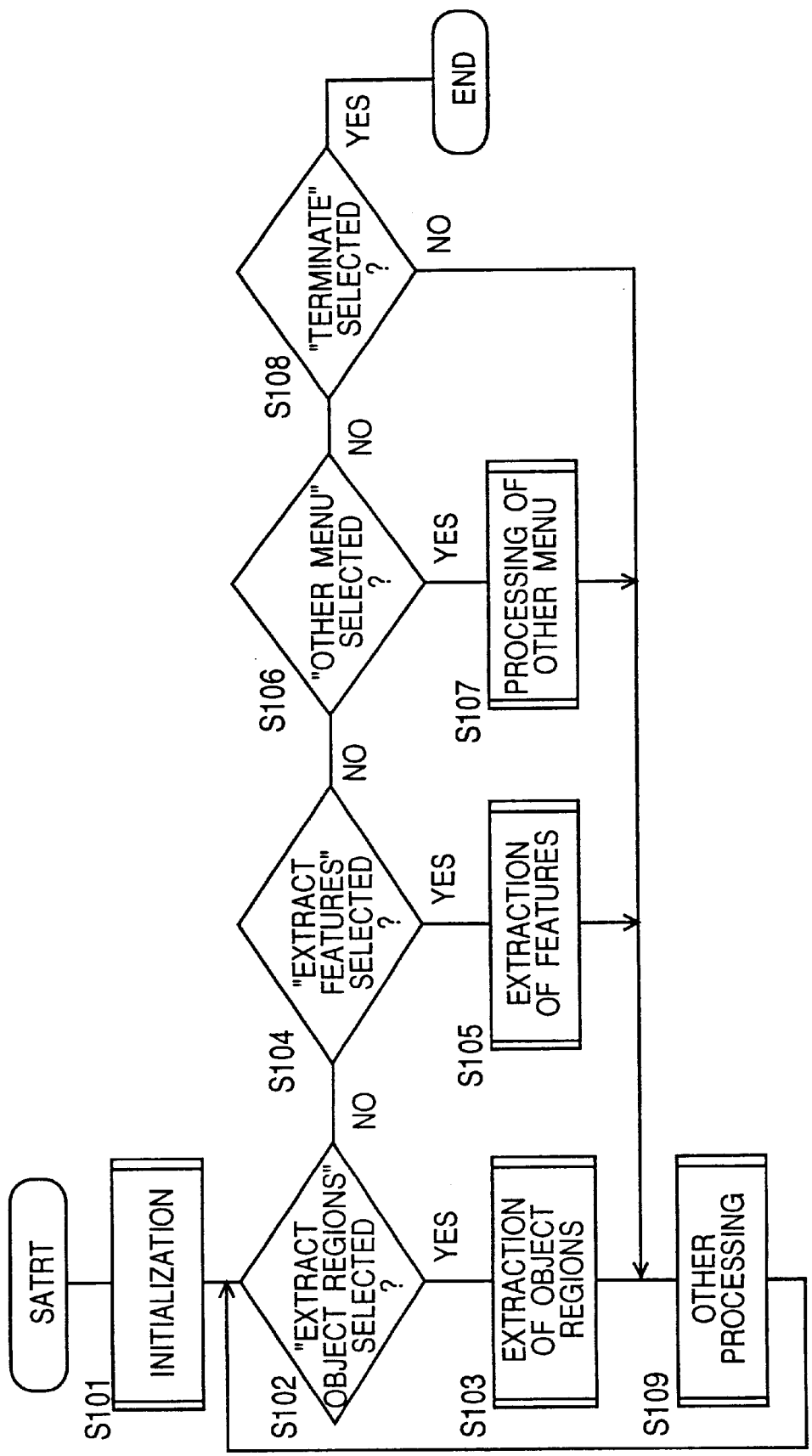
FIG. 10 is a flowchart of a main routine to be executed under control of a CPU in the second embodiment.

The characteristic-region extracting apparatus operates according to the flowcharts of FIG. 10, FIG. 11, FIG. 12 and FIG. 13. FIG. 10 is a flowchart of a main routine of the program executed in the above characteristic-region extracting apparatus.

Upon turning on the apparatus, the program starts, and at step S101, necessary flags used in each processing described later are initialized, and also, initial setting such as display of an initial screen is executed.

Next, the program flow proceeds to step S102 at which it is determined whether or not an item "EXTRACT OBJECT REGIONS" has been selected from a job menu on the initial screen of the CRT 12. If it is determined that the "EXTRACT OBJECT REGIONS" has been selected, then the program flow proceeds to step S103 to execute a process of "extraction of object regions" by means of the object region extracting section 102 and then proceeds to step S109. If it is determined at step S102 that the item "EXTRACT OBJECT REGIONS" has not been selected, then the program flow proceeds to step S104.

Next, it is determined at step S104 whether or not an item "EXTRACT FEATURES" has been selected. If it is determined that the item "EXTRACT FEATURES" has been selected, then the program flow proceeds to step S105 to perform a process of "extraction of features" by means of the feature extracting section 103, and the program flow proceeds to step S109. If it is determined at step S104 that the job "EXTRACT FEATURES" has not been selected, then the program flow proceeds to step S106.

Next, it is determined at step S106 whether or not an item "OTHER MENU" has been selected. If it is determined that the item "OTHER MENU" has been selected, then the program flow proceeds to step S107 to execute the other menu processing and then proceeds to step S109. If it is determined that the item "OTHER MENU" has not been selected, then the program flow proceeds to step S108.

Then, it is determined at step S108 whether or not an item "TERMINATE" has been selected. If it is determined that the "TERMINATE" has been selected, then the processing of the main routine ends. If it is determined at step S108 that the item "TERMINATE" has not been selected, then the program flow proceeds to step S109 to execute other processing and then returns to step S102.

The process of "extraction of object regions" at step S103 and the process of "extraction of features" at step S105 will be described below. It is to be noted that the other steps have no direct relation to the present invention, and therefore, that no detailed description is provided therefor.

<Extraction of Object Regions>

Figure 11:
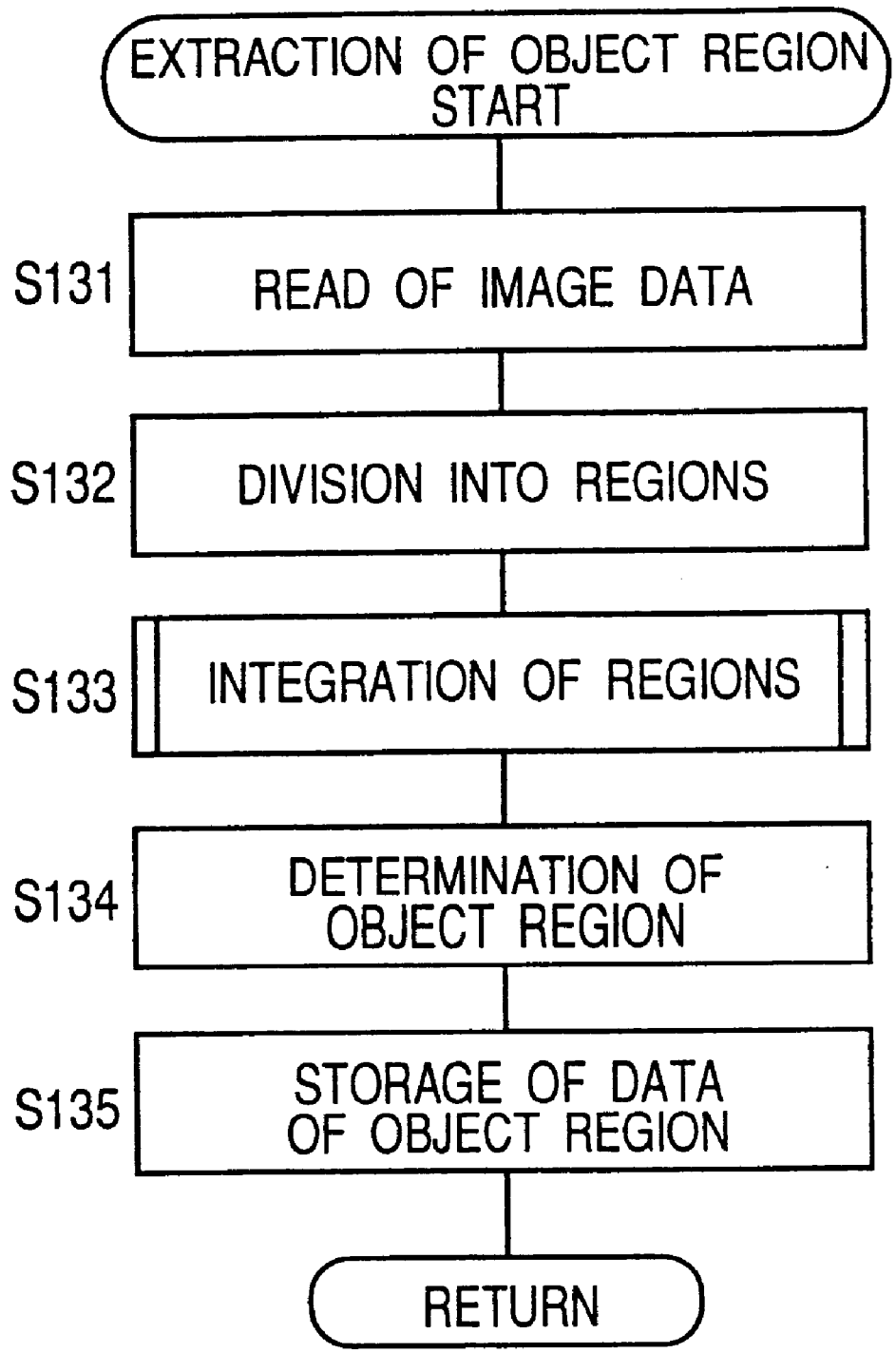
FIG. 11 is a flowchart showing an object region extracting process performed in the main routine of FIG. 10.

FIG. 11 is a flowchart showing a subroutine for the "extraction of object regions" process executed by the object region extracting section 102 at step S103 of the main routine.

First, image data to be subjected to the object region extracting process is read at step S131.

Next, the program flow proceeds to step S132 to execute the image division by means of the image dividing portion 102a utilizing color information of the image. The image division can be done by, for example, classifying colors of the image according to the color information of the image and then dividing the image into regions according to the color classification.

Next, the program flow proceeds to step S133 at which, of all the regions or divisions of the image, those that are determined to be originally parts of a single region are integrated into the single region by the region integrating portion 102b, as described later in more detail.

Next, the program flow proceeds to step S134, and in order to extract object regions, it is determined by the object region determining portion 102c whether or not the regions obtained as a result of the region integration process are object regions. The determination is performed by, for example, the following method (1) or (2).

(1) Regions located near the center of the image are determined to be object regions.

(2) Regions that have a size larger than a predetermined size and that reach any one of the edges of the image are determined to be background regions, and the other regions of the image are determined to be object regions.

After determination of the object regions, the program flow proceeds to step S135 to store the object region data and then returns to the main routine of FIG. 10.

Figure 12:
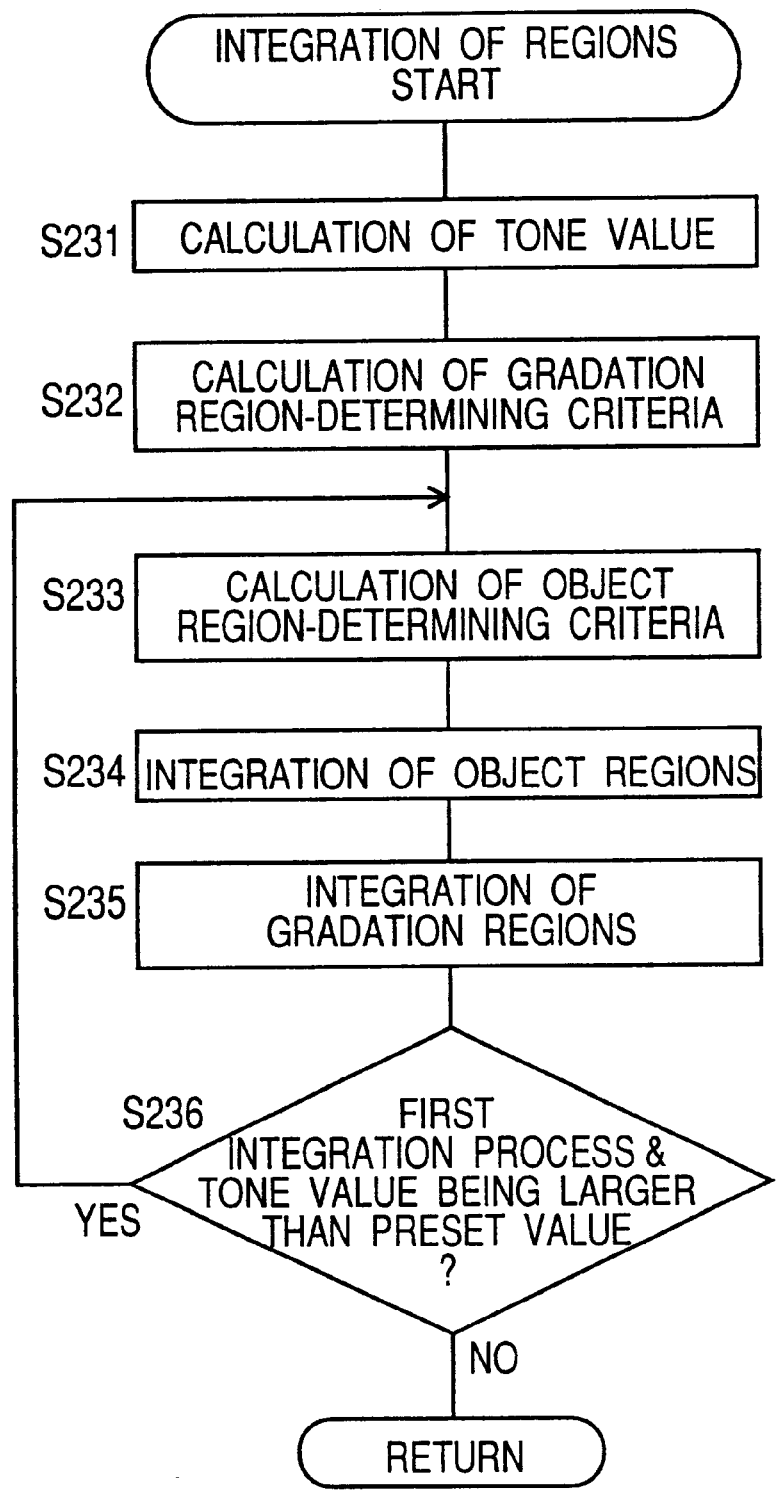
FIG. 12 is a flowchart showing a region integrating process performed in the object region extracting subroutine of FIG. 11.

FIG. 12 is a flowchart showing a subroutine of the "integration of regions" process performed at step S133 of FIG. 11.

First, a tone value of the whole image is calculated from the color information of the image at step S231. The tone value of the image can be calculated by, for example, the following method (i) or (ii).

(i) The mean value of saturation values of the pixels in the whole image, obtained from the following equation, is used as the tone value.

$$\text{Tone value} = \frac{\sum (\text{Saturation value of pixel})}{\text{Number of pixels}}$$

(ii) A histogram is formed by dividing the image in the direction of saturation by an arbitrary number, and representative saturation values of the regions or divisions of the histogram are weighted such that the greater weight is assigned to the higher saturation. Then, a centroid value (mean value of the weighted representative saturation values) is calculated and used as the tone value as shown below.

Number of divisions in saturation direction: $N$

Representative saturation value of each division: $S_i (i = 1 - N)$

-continued $$\text{Weight of each division } W_i = \frac{1.0}{N} i$$

$$\text{Tone value} = \frac{\sum_i S_i \cdot W_i}{\sum_i W_i}$$

Next, the program flow proceeds to step S232 to calculate gradation region-determining criteria (values used in determining a gradation region) on the basis of a color difference between adjacent pixels. As the gradation region criteria, mean values respectively of the hue differences, the lightness differences and the saturation differences between adjacent pixels, which are calculated as follows, are utilized.

$$\text{Image size: } M \times N \text{ (pixels)}$$

$$\text{Color of each pixel: } (H, L, S)_{i,j}$$

$$\text{Hue difference mean value} = \frac{\sum_{i,j} |H_{i,j} - H_{i+1,j}| + \sum_{i,j} |H_{i,j} - H_{i,j+1}|}{(M-1) \cdot N + (N-1)}$$

$$\text{Hue difference: } 0.0 - 180.0$$

Luminosity difference mean value =

$$\frac{\sum_{i,j} |L_{i,j} - L_{i+1,j}| + \sum_{i,j} |L_{i,j} - L_{i,j+1}|}{(M-1) \cdot N + (N-1)}$$

Luminosity difference: 0.0 – 1.0

Saturation difference mean value =

$$\frac{\sum_{i,j} |S_{i,j} - S_{i+1,j}| + \sum_{i,j} |S_{i,j} - S_{i,j+1}|}{(M-1) \cdot N + (N-1)}$$

Saturation difference: 0.0 – 1.0

Next, the program flow proceeds to step S233 to calculate object region-determining criteria (i.e., values used in determining whether or not adjacent regions should be integrated or united as one object region) from the color differences between pixels abutting on, or immediately to both sides of the boundary line of adjacent regions. As the object region-determining criteria, use is made of a criterion for determining the hue of the object region (referred to as "object region hue criterion"), a criterion for determining the lightness of the object region (referred to as simply "object region lightness criterion"), and a criterion for determining the saturation of the object region (referred to as simply "object region saturation criterion") which are obtained on the basis of the relevant mean value and standard deviation value of the color differences between adjacent pixels immediately to both sides of the boundary line, as shown below.

Color difference mean values between pixels immediately to both sides of boundary: $dH, dL, dS$ Color difference standard deviation values between pixels immediately to both sides of boundary: $sH, sL, sS$ $$\text{Object region hue criterion} = \left(dH + \frac{2}{3}sH^2\right) \bigg/ 2.0$$

$$\text{Object region lightness criterion} = \left(dL + \frac{2}{3}sL^2\right) \bigg/ 2.0$$

$$\text{Object region saturation criterion} = \left(dS + \frac{2}{3}sS^2\right) \bigg/ 2.0$$

Then, in conformity to the tone value of the whole image, the object region hue criterion, the object region lightness criterion and/or the object region saturation criterion is selected and processed according to the following conditions (i) through (iii).

(i) If the tone value is lower than a specified lower threshold value, then the object region hue criterion and the object region lightness criterion from among the object region determining-criteria are used as judging conditions.

(ii) If the tone value is between the specified lower threshold value and a specified upper threshold value, then the object region hue criterion among the object region determining criteria is used as a judging condition. The object region lightness criterion and the object region saturation criterion are also used as determination conditions when these values are greater than predetermined values, respectively.

(iii) If the tone value is higher than the specified upper threshold value, then all of the object region hue criterion, the object region lightness criterion, and the object region saturation criterion are used as judging conditions. In addition, when the object region hue criterion, the object region lightness criterion, and the object region saturation criterion are larger than predetermined values, respectively, each criterion is made smaller such that conditions for integration of regions become stricter.

Next, the program flow proceeds to step S234 to integrate mutually related regions regarged as parts of one object region by means of the object region-determining criterion or criteria selected at step S233. In this region integrating process, the mean values of color (hue, lightness and saturation) of the pixels included in one region are calculated for every region, and thereafter a difference between the mean color values of the adjacent regions is calculated. If the calculated difference in mean color value between the adjacent regions is smaller than the corresponding object region-determining criterion, then these regions are judged to constitute a same object region and thus integrated with each other.

Next, the program flow proceeds to step S235 to integrate regions as one gradation region, using the gradation region determining criteria. In this gradation region integrating process, three consecutive regions are sought in the horizontal direction and the vertical direction of the image, and a color difference between the pixels immediately to both sides of each boundary line between the three regions is calculated. If the color difference between the pixels is smaller than the gradation region criterion, and if the directions of change of color (hue, lightness and saturation) across two boundary lines are the same, i.e., the hue, lightness and saturation change across two boundary lines in a single direction, then these three regions are integrated as one gradation region.

Then, the program flow proceeds to step S236. If it is determined that the performed region integration process is the first one and if the tone value is greater than a preset value, then the program flow proceeds to step S233 to execute again the integration processes for the object regions and gradation regions. If it is determined at step S236 that the region integration process is the first one but the tone value is equal to or smaller than the preset value, then the program flow returns to the routine of FIG. 11.

<Extraction of Features>

FIG. 13 is a flowchart showing the subroutine for the extraction of features executed by the feature extracting section 103 at step S104 of the main routine of FIG. 10.

First, the image data to be subjected to the feature extraction is read at step S1S1.

Next, at step S152, object region data corresponding to the read image data is read.

Next, at step S153, features of the image are extracted from the image data and the object region data.

Then, at step S154, the extracted features are stored. Thereafter the program flow returns to the main routine of FIG. 10.

The features extracted from the image data and the object region data at step S153 include, for example, the following items (i) and (ii).

(i) Color information and texture information of the whole image.

(ii) Size, color information, contour and texture information of the regions.

The obtained features are utilized for image recognition, image retrieval and so on.

As described above, in the second embodiment, taking in account the directions of color change across the boundary lines between the regions as well as the gradation region determining criteria, determination and integration of gradation regions in the objects and the background of the image are performed. As a result, an object region including gradation and shade in the image can be extracted as a single region, and not as a plurality of regions.

Furthermore, in the second embodiment, the mean values of the color differences (hue difference, lightness difference and saturation difference) between the pixels of the color image are utilized as criteria for determining the gradation region. Therefore, criteria appropriate for determination of the gradation region are attained.

Furthermore, according to the second embodiment, in the case that there are three consecutive regions in either the horizontal direction or the vertical direction of the color image, if the color difference between the pixels positioned immediately on both sides of each boundary line of the regions is smaller than the gradation region criterion and if the direction of color change across one boundary line between the first and second regions is the same as the direction of color change across the other boundary line between the second and third regions, then, those three regions are judged to constitute a gradation region and integrated with one another. Thus, the gradation region can be reliably attained. It will be easily understood that four or more consecutive regions may be integrated as the gradation region instead of integrating the three consecutive regions. Determination as to presence of gradation may be executed on the regions which are consecutive in a direction other than the horizontal direction and the vertical direction.

Further, in the second embodiment, it is determined whether the adjacent regions are object regions, by using the object region-determining criteria processed in accordance with the tone value of the whole color image, and the adjacent regions determined to be object regions are integrated into one region. Thus, the regions of the object including the gradation and shade can be integrated into one object region.

If the mean value of the saturations of all the pixels of the color image is used as the tone value, then the tone of the whole color image can be easily and appropriately represented.

Further, if the tone value is obtained by forming a histogram by dividing the whole color image into regions in the direction of the axis of saturation, weighting representative saturation values of the regions with respective values that increase as the vividness increases, and then averaging the weighted representative saturation values, then, the tone value can conspicuously represent the features of colors of the color image. Therefore, the tone value obtained is effective in the object region integration even for a color image of colors of undertints.

Furthermore, according to the second embodiment, because the object region-determining criteria (i.e., the object region hue criterion, the lightness criterion, and the saturation criterion) are based on not only the mean values of the hue differences, the lightness differences and the saturation differences, respectively, between the pixels abutting on each boundary line of the regions from both sides of the boundary line but also the standard deviation values therof, color differences at the boundary between an object and the background can be definitely discriminated so that objects in the color image can be definitely distinguished from the background.

Further, in the second embodiment, because the difference between the color mean values of the adjacent regions is compared with the corresponding object region-determining criterion processed in accordance with the tone value of the whole color image, object regions can be reliably determined and integrated.

The modifications and variations mentioned in connection with the first embodiment can also be similarly applied to the second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of dividing a color image into regions, comprising the steps of:

calculating color differences between pixels of the color image;

determining widths of division in directions of axes of a color space on the basis of the color differences between the pixels;

setting color classification numbers for respective color space regions into which the color space has been divided according to the widths of division in the directions of the axes;

labeling each pixel of the color image with the color classification number of a corresponding color space region in which a color of the pixel is included; and dividing the color image into same-color regions based on the color classification numbers of the labeled pixels, wherein when consecutive labeled pixels have a same classification number, those pixels are determined to constitute one same-color region.

2. The method according to claim 1, wherein the color space is an HLS color space defined by hue, lightness and saturation, and in the step of determining widths of division, the widths of division in directions of axes of the HLS color space are determined based on mean values of differences in hue, in lightness, and in saturation between the pixels.

3. The method according to claim 1, wherein the color space is an HLS color space defined by hue, lightness and saturation, and in the step of determining widths of division, the width of division in a direction of an axis of hue of the HLS color space is determined based on a mean value and a standard deviation of differences in hue between the pixels, the width of division in a direction of an axis of lightness of the HLS color space is determined based on a mean value and a standard deviation of differences in lightness between the pixels, and the width of division in a direction of an axis of saturation of the HLS color space is determined based on a mean value and a standard deviation of differences in saturation between the pixels.

4. A program storage medium which stores an information processing program, wherein the information processing program comprises the steps of:

calculating color differences between pixels of the color image;

determining widths of division in directions of axes of a color space on the basis of the color differences between the pixels;

setting color classification numbers for respective color space regions into which the color space has been divided according to the widths of division in the directions of the axes;

labeling each pixel of the color image with the color classification number of a corresponding color space region in which a color of the pixel is included; and dividing the color image into same-color regions based on the color classification numbers of the labeled pixels, wherein when consecutive labeled pixels have a same classification number, those pixels are determined to constitute one same-color region.

5. A method of dividing a color image into regions, comprising the steps of:

dividing a color image into regions based on color information of the color image;

calculating a gradation region-determining criterion based on color differences between pixels of the color image; and integrating consecutive regions among all the regions of the color image with one another when these consecutive regions are judged to constitute one gradation region, wherein judgement whether or not the consecutive regions constitute a gradation region is done based on the gradation region-determining criterion and continuity of color change at each of boundaries between the consecutive regions.

6. The method according to claim 5, wherein in the step of calculating a gradation region-determining criterion, a mean value of the color differences between the pixels is calculated as the gradation region-determining criterion.

7. The method according to claim 5, wherein in the step of integrating consecutive regions, with respect to at least three consecutive regions ranging in one direction of the color image, these consecutive regions are judged to constitute a gradation region when color differences between pixels immediately to both sides of each boundary of the consecutive regions are smaller than the gradation region-determining criterion and a direction in which color changes is same at each boundary of the consecutive regions.

8. The method according to claim 5, further comprising the steps of:

calculating a tone value of the entire color image based on saturation values of the pixels of the color image;

calculating an object region-determining criterion based on color differences between pixels immediately to both sides of each of boundaries of the regions; and integrating adjacent regions among all the regions of the color image with each other when these regions are judged to be object regions, wherein judgement whether or not the adjacent regions are object regions is done based on the object region-determining criterion processed in accordance with the tone value of the entire color image.

9. The method according to claim 8, wherein in the step of calculating a tone value of the entire color image, a mean value of the saturation values of all the pixels of the color image is calculated as the tone value of the entire color image.

10. The method according to claim 8, wherein in the step of calculating a tone value of the entire color image, a histogram is prepared which represents number of pixels in each of regions into which the color image has been divided in a direction of an axis of saturation, representative saturation values of the regions are weighted by corresponding values that increase in accordance with vividness of the regions, and an average saturation is obtained as the tone value from the histogram having the representative saturation values weighted.

11. The method according to claim 8, wherein in the step of calculating an object region-determining criterion, a value is obtained from a mean value and a standard deviation of color differences between the pixels immediately to both sides of each of boundaries of the regions and the obtained value is determined as the object region-determining criterion.

12. The method according to claim 8, wherein in the step of integrating adjacent regions, an average color value of the pixels included in one region is calculated every region, and when a difference between the average color values of the adjacent regions is smaller than the object region-determining criterion that has processed according to the tone value of the entire color image, the adjacent regions are integrated with each other into one object region.

13. A program storage medium which stores an information processing program for dividing a color image into regions, wherein the information processing program comprises the steps of:

dividing a color image into regions based on color information of the color image;

calculating a gradation region-determining criterion based on color differences between pixels of the color image; and integrating consecutive regions among all the regions of the color image with one another when these consecutive regions are judged to constitute one gradation region, wherein judgement whether or not the consecutive regions constitute a gradation region is done based on the gradation region-determining criterion and continuity of color change at each of boundaries between the consecutive regions.

14. An image processing device, comprising:

a memory for storing data of a color image;

a setting section which determines widths of division in directions of axes of a color space on the basis of color differences between pixels of the color image stored in the memory, and sets a color classification number for each of color space regions into which the color space has been divided according to the widths of division; and a processing section which labels each pixel of the color image stored in the memory with the color classification number of a corresponding color space region in which a color of the pixel is included.

15. The image processing device according to claim 14, further comprising a dividing section which divides the color image into regions based on the color classification numbers of the labeled pixels, wherein when consecutive is labeled pixels have a same classification number, those pixels are determined to constitute one region.

16. An image processing device, comprising:
- a memory for storing data of a multiplicity of regions into which a color image has been divided based on color information of the color image;
- a setting section which determines a criterion used for judging whether adjacent regions among the multiplicity of regions constitute a gradation region, based on color differences between pixels of the color image; and
- a processing section which integrates the adjacent regions when judging the adjacent regions to be a gradation region based on the criterion set by the setting section and continuity of color change at each of boundaries between the adjacent regions.

17. A method of dividing a color image into regions, comprising the steps of:
- calculating color differences between unit areas of the color image;
- determining widths of division in directions of axes of a color space on the basis of the color differences between the unit areas;
- setting color classification numbers for respective color space regions into which the color space has been divided according to the widths of division in the directions of the axes;
- labeling each unit area of the color image with the color classification number of a corresponding color space region in which a color of the unit area is included; and
- dividing the color image into same-color regions based on the color classification numbers of the labeled unit areas, wherein when consecutive labeled unit areas have a same classification number, those unit areas are determined to constitute one same-color region.

18. A program storage medium which stores an information processing program, wherein the information processing program comprises the steps of:
- calculating color differences between unit areas of the color image;
- determining widths of division in directions of axes of a color space on the basis of the color differences between the unit areas;
- setting color classification numbers for respective color space regions into which the color space has been divided according to the widths of a division in the directions of the axes;
- labeling each unit area of the color image with the color classification number of a corresponding color space region in which a color of the unit area is included; and
- dividing the color image into same-color regions based on the color classification numbers of the labeled unit areas, wherein when consecutive labeled unit areas have a same classification number, those unit areas are determined to constitute one same-color region.

19. A method of dividing a color image into regions, comprising the steps of:
- dividing a color image into regions based on color information of the color image;
- calculating a gradation region-determining criterion based on color differences between unit areas of the color image; and
- integrating consecutive regions among all the regions of the color image with one another when these consecutive regions are judged to constitute one gradation region, wherein judgement whether or not the consecutive regions constitute a gradation region is done based on the gradation region-determining criterion and continuity of color change at each of boundaries between the consecutive regions.

20. A program storage medium which stores an information processing program for dividing a color image into regions, wherein the information processing program comprises the steps of:
- dividing a color image into regions based on color information of the color image;
- calculating a gradation region-determining criterion based on color differences between unit areas of the color image; and
- integrating consecutive regions among all the regions of the color image with one another when these consecutive regions are judged to constitute one gradation region, wherein judgement whether or not the consecutive regions constitute a gradation region is done based on the gradation region-determining criterion and continuity of color change at each of boundaries between the consecutive regions.

21. An image processing device, comprising:
a memory for storing data of a color image;
a setting section which determines widths of division in directions of axes of a color space on the basis of color differences between unit areas of the color image stored in the memory, and sets a color classification number for each of color space regions into which the color space has been divided according to the widths of division; and
a processing section which labels each unit area of the color image stored in the memory with the color classification number of a corresponding color space region in which a color of the unit area is included.

22. An image processing device,z comprising:
a memory for storing data of a multiplicity of regions into which a color image has been divided based on color information of the color image;
a setting section which determines a criterion used for judging whether adjacent regions among the multiplicity of regions constitute a gradation region, based on color differences between unit areas of the color image; and
a processing section which integrates the adjacent regions when judging the adjacent regions to be a gradation region based on the criterion set by the setting section and continuity of color change at each of boundaries between the adjacent regions.

* * * * *